united States Patent Office 3,227,710
Patented Jan. 4, 1966

3,227,710
PROCESS OF PRODUCING 6-CHLORO-7-SULFAM-YL-3,4-DIHYDRO-1,2,4-BENZOTHIADIAZINE-1,1-DIOXIDE COMPOUNDS AND PRODUCTS
Oskar Bub, Ludwigshafen (Rhine), Germany, assignor to Knoll A.-G., Chemische Fabriken, Ludwigshafen (Rhine), Germany, a company of Germany
No Drawing. Filed Nov. 29, 1961, Ser. No. 155,858
Claims priority, application Germany, Dec. 2, 1960, K 42,298
9 Claims. (Cl. 260—243)

The present invention relates to a new and improved process of producing 6-chloro-7-sulfamyl-3,4-dihydro-1,2,4-benzothiadiazine-1,1-dioxide compounds and to new products so produced.

It is known to prepare 6-chloro-7-sulfamyl-3,4-dihydro-1,2,4-benzothiadiazine-1,1-dioxide by reacting 5-chloro-2,4-disulfamyl aniline or its salts with formaldehyde or its polymers, its acetals, or with hexamethylene tetramine. The 5-chloro-2,4-disulfamyl aniline is usually prepared by starting with m-chloro aniline which is sulfochlorinated. The resulting disulfochloride is subsequently transformed into the corresponding disulfamyl compound.

It is one object of the present invention to provide a simple and effective process of producing 6-chloro-7-sulfamyl - 3,4 - dihydro - 1,2,4 - benzothiadiazine - 1,1-dioxide compounds whereby m-dihalogeno benzene is used as starting material and the resulting reaction products are obtained in a surprisingly high yield.

Another object of the present invention is to provide new and valuable 6-chloro-7-sulfamyl-3,4-dihydro-1,2,4-benzothiadiazine-1,1-dioxide compounds which have valuable pharmaceutical properties.

Other objects of the present invention and advantageous features thereof will become apparent as the description proceeds.

The process according to the present invention consists in principle in reacting 4,6-dihalogeno benzene-1,3-disulfonic acid dichloride with at least 3 moles of an amine of the Formula II $$R-NH_2 \quad (II)$$

and at least 1 mole of formaldehyde, preferably in the presence of hydrogen halide-binding agents. Thereby, 6-halogeno - 7 - sulfamyl - 3,4 - dihydro - 1,2,4 - benzothiadiazine - 1,1 - dioxide compounds of Formula I are obtained:

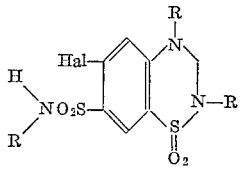

(I)

In said formula

Hal represents halogen, preferably chlorine and bromine, and

R represents hydrogen, alkyl, alkenyl, or hydroxy alkyl, aryl, or aralkyl which may be substituted in the aromatic ring by halogen, hydroxyl, alkoxy, or alkyl, whereby the alkyl, alkenyl, hydroxy alkyl, alkoxy or alkyl substituents are preferably substituents with 1 to 5 carbon atoms.

Preferably the reaction is carried out at elevated temperature and in the presence of solvents such as water, organic solvents, or mixtures thereof. When using readily volatile amines as the one reaction component, operation in closed reaction vessels, if necessary under pressure, is required.

Undesired side reactions caused by the acid set free during the reaction are advantageously avoided by carrying out the reaction in the presence of hydrogen halide-binding agents. For this purpose an excess of the amine of the formula $H_2N-R$ may be used. Other suitable agents are, for instance, alkali metal bicarbonates, alkaline earth metal oxides, or tertiary amines, such as pyridine, dimethylaniline, and the like.

The reaction according to the invention is carried out either in a one-step operation or in two steps. In the two-step procedure 4,6-dihalogeno benzene-1,3-disulfonic acid dichlorides are first converted into 4,6-dihalogeno benzene-1,3-disulfonic acid diamides of Formula III

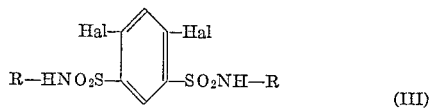

(III)

which are then caused to react so as to form the benzothiadiazine ring. When proceeding in two steps, it is possible to use an amine in the second reaction step which differs from that of the first reaction step so that 3,4 - dihydro - 1,2,4 - benzothiadiazine - 1,1 - dioxides are obtained which carry in positions 2 and 7 identical radicals R while the radical R in position 4 differs therefrom.

In place of formaldehyde, there may be used compounds which are capable of yielding monomeric formaldehyde under the reaction conditions, for instance, formaldehyde polymers, formaldehyde acetals, or hexamethylene tetramine. Using hexamethylene tetramine permits carrying out the process according to the present invention in a specific manner because this compound yields not only formaldehyde but also ammonia. Thus addition of an amine is not necessary.

Using readily available starting materials, the new process allows to prepare in a simple manner 3,4 - dihydro - 1,2,4 - benzothiadiazine - 1,1 - dioxide compounds carrying several substituents. In contrast thereto the preparation of 4 - substituted 3,4 - dihydro - 1,2,4 - benzothiadiazine-1,1-dioxide compounds according to known methods requires an additional operation, i.e. substitution of a hydrogen atom in the aniline-nitrogen atom by organic radicals. Such compounds can readily be prepared according to the present invention without additional reaction steps.

A number of products obtained according to the new process are new compounds which also possess diuretic activity and are useful in therapy.

The following examples serve to illustrate the present invention, without, however, limiting the same thereto.

EXAMPLE 1

*6-chloro-7-sulfamyl-3,4-dihydro-1,2,4-benzothiadiazine-1,1-dioxide*

(a) 10.5 g. of 4,6-dichloro benzene-1,3-disulfonic acid dichloride are added at 0° C. to 50 cc. of a saturated alcoholic ammonia solution. 3.5 g. of a 30% aqueous formaldehyde solution are added to the mixture. The reaction mixture is then heated in the closed reaction vessel to 150° C. for 10 hours. The solvent is distilled off and the residue is acidified by the addition of dilute hydrochloric acid. The oily reaction product crystallizes on standing in the refrigerator. On recrystallization from 60% ethanol with the addition of animal charcoal the compound is obtained in the form of white crystals of the melting point 267–269° C.

The aqueous formaldehyde solution may be replaced by 0.8 g. of hexamethylene tetramine while otherwise proceeding under the same reaction conditions.

(b) 20 g. of 4,6-dichloro benzene-1,3-disulfonic acid dichloride are added to 100 cc. of liquid ammonia while stirring. The ammonia is allowed gradually to evaporate. The solid residue is washed with water and recrystallized from 75% ethanol. Melting point: 270–271° C.

9 g. of the resulting 4,6-dichloro benzene-1,3-disulfonic acid diamide are further reacted in a closed vessel as described under (a) with alcoholic ammonia solution and 3.5 g. of a 30% formaldehyde solution. The same compound is obtained as described under (a). It is not necessary to isolate the diamide obtained in the first reaction step.

EXAMPLE 2

*6-chloro-4-methyl-7-sulfamyl-3,4-dihydro-1,2,4-benzothiadiazine-1,1-dioxide*

(a) 9 g. of 4,6-dichloro benzene-1,3-disulfonic acid diamide obtained according to Example 1, are heated in a closed reaction vessel with 5 g. of a 40% aqueous methylamine solution, 3.5 g. of a 30% aqueous formaldehyde solution, and 50 cc. of ethanol to 130° C. for 10 hours. After cooling, the crystallized compound is recrystallized from 50% ethanol. Melting point: 253–254° C.

In place of the aqueous formaldehyde solution, 1 g. of paraformaldehyde or 2.5 g. of formaldehyde dimethyl acetal may be used in the reaction.

In the same manner as described hereinabove there are obtained the following compounds by reacting 4,6-dichloro benzene-1,3-disulfonic acid diamide with the corresponding amines and formaldehyde or its derivatives:

(b) 6 - chloro - 4 - ethyl-7-sulfamyl-3,4-dihydro-1,2,4-benzothiadiazine-1,1-dioxide.

Melting point: 214–216° C. (On recrystallization from 50% ethanol.)

(c) 6 - chloro-4-isopropyl-7-sulfamyl-3,4-dihydro-1,2,4-benzothiadiazine-1,1-dioxide.

Melting point: 213–215° C. (On recrystallization from 75% ethanol.)

(d) 6 - chloro - 4 - allyl-7-sulfamyl-3,4-dihydro-1,2,4-benzothiadiazine-1,1-dioxide.

Melting point: 197–198° C. (On recrystallization from 50% ethanol.)

(e) 6 - chloro - 4-phenyl-7-sulfamyl-3,4-dihydro-1,2,4-benzothiadiazine-1,1-dioxide.

Melting point: 220–222° C. (On recrystallization from ethanol.)

(f) 6 - chloro - 4 - (4'-chlorophenyl)-7-sulfamyl-3,4-dihydro-1,2,4-benzothiadiazine-1,1-dioxide.

Melting point: 246–247° C. (On recrystallization from ethanol.)

(g) 6 - chloro - 4-benzyl-7-sulfamyl-3,4-dihydro-1,2,4-benzothiadiazine-1,1-dioxide.

Melting point: 204–205° C. (On recrystallization from 50% ethanol.)

EXAMPLE 3

*6-chloro-4-(β-hydroxy ethylamino)-7-sulfamyl-3,4-dihydro-1,2,4-benzothiadiazine-1,1-dioxide*

9 g. of 4,6-dichloro benzene-1,3-disulfonic acid diamide obtained according to Example 1(b) are heated to boiling under reflux with 4 g. of ethanolamine and 3.5 g. of a 30% formaldehyde solution in 100 cc. of ethanol for 48 hours. The solvent is distilled off and the residue is acidified by the addition of dilute hydrochloric acid. The reaction product is first obtained in the form of a smeary mass. It crystallizes on standing for a prolonged period of time and is recrystallized from 50% ethanol. Melting point: 196–198° C.

EXAMPLE 4

*6-chloro-2-methyl-7-methyl sulfamyl-3,4-dihydro-1,2,4-benzothiadiazine-1,1-dioxide*

10 g. of 4,6-dichloro benzene-1,3-disulfonic acid bis-methylamide obtained from 4,6-dichloro benzene-1,3-disulfonic acid dichloride and methylamine according to the procedure described in Example 1(b), are reacted as described in Example 1(a) with 50 cc. of a saturated alcoholic ammonia solution and 3.5 g. of a 30% aqueous formaldehyde solution. The resulting reaction product, on recrystallization from ethanol, has a melting point of 202–204° C.

EXAMPLE 5

*6-bromo-4-methyl-7-sulfamyl-3,4-dihydro-1,2,4-benzothiadiazine-1,1 dioxide*

12 g. of 4,6-dibromo benzene-1,3-disulfonic acid diamide obtained according to Example 1(b), are reacted as described in Example 2(a) with 5 g. of a 40% aqueous methylamine solution and 3.5 g. of a 30% aqueous formaldehyde solution in 50 cc. of ethanol. The resulting reaction product has a melting point of 243–245° C. (on recrystallization from 30% aqueous dimethyl formamide).

It is understood that, in place of the amines used as reactants in the preceding examples, there may be employed other amines such as n-propylamine, n-butylamine, isobutylamine, n-amylamine, isoamylamine, 4-methoxy aniline, 4-ethoxy aniline, 4-methyl aniline, 4-amino phenol, 4-chloro benzylamine, and others, while the procedure is the same as described in the preceding examples.

Of course, many changes and variations in the reaction components, in the reaction conditions, temperature, and duration, in the solvents used, in the methods of working up and purifying the reaction products, and the like may be made by those skilled in the art in accordance with the principles set forth herein and in the claims annexed hereto.

I claim:

1. In a process of producing 6-halogeno-7-sulfamyl-3,4-dihydro-1,2,4-benzothiadiazine-1,1-dioxide compounds of the formula

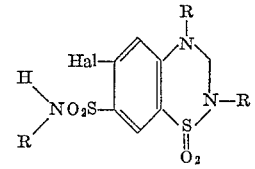

wherein

Hal represents halogen and

R represents a member selected from the group consisting of lower alkyl, lower alkenyl, hydroxy lower alkyl, phenyl, benzyl, and phenyl and benzyl substituted in the aromatic ring by a substituent selected from the group consisting of halogen, hydroxyl, lower alkoxy, and lower alkyl, the step which comprises mixing a 4,6-dihalogeno benzene-1,3-disulfonic acid dichloride with at least 3 moles of an amine of the formula $$H_2N—R$$

wherein R represents the same members as indicated above, and at least one mole of formaldehyde and heating the resulting mixture to cause cyclization.

2. The process according to claim 1 wherein the reaction is carried out with the addition of a hydrogen halide binding agent.

3. In a process of producing 6-halogeno-7-sulfamyl-3,4-dihydro-1,2,4-benzothiadiazine-1,1-dioxide compounds of the formula

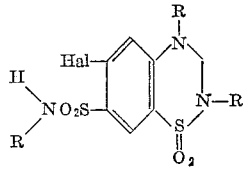

wherein
  Hal represents halogen and
  R represents a member selected from the group consisting of hydrogen, lower alkyl, lower alkenyl, hydroxy lower alkyl, phenyl, benzyl, and phenyl and benzyl substituted in the aromatic ring by a substituent selected from the group consisting of halogen, hydroxyl, lower alkoxy, and lower alkyl,
the steps which comprise mixing a 4,6-dihalogeno benzene-1,3-disulfonic acid dichloride with an amine of the formula

H₂N—R wherein R represents the same member as indicated above, to convert said acid dichloride into the 4,6-dihalogeno benzene-1,3-disulfonic acid diamide of the formula

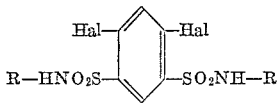

and heating said diamide with an amine of the formula

H₂N—R wherein R represents the same members as indicated above, and formaldehyde to cause cyclization to the benzothiadiazine ring.

4. The process according to claim 1, wherein formaldehyde is replaced by a member selected from the group consisting of a formaldehyde polymer, an acetal of formaldehyde, and hexamethylene tetramine.

5. The process according to claim 3, wherein formaldehyde is replaced by a member selected from the group consisting of a formaldehyde polymer, an acetal of formaldehyde, and hexamethylene tetramine.

6. The process according to claim 4, wherein there is used hexamethylene tetramine.

7. The process according to claim 5, wherein there is used hexamethylene tetramine.

8. The process according to claim 2, wherein the hydrogen halide-binding agent is an excess of the amine of the formula H₂N—R.

9. In a process of producing 6-halogeno-7-sulfamyl-3,4-dihydro-1,2,4-benzothiadiazine-1,1-dioxide compounds of the formula

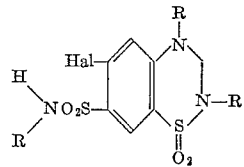

wherein
  Hal represents halogen and
  R represents a member selected from the group consisting of hydrogen, lower alkyl, lower alkenyl, hydroxy lower alkyl, phenyl, benzyl, and phenyl and benzyl substituted in the aromatic ring by a substituent selected from the group consisting of halogen, hydroxyl, lower alkoxy, and lower alkyl.

the steps which comprise heating a 4,6-dihalogeno benzene-1,3-disulfonic acid diamide of the formula

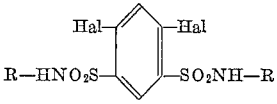

wherein R represents the same members as indicated above, with an amine of the formula

H₂N—R wherein R represents the same members as indicated above, and formaldehyde to cause cyclization to the benzothiadiazine ring.

References Cited by the Examiner

UNITED STATES PATENTS 3,025,292   3/1962   Jones et al. _____ 260—243

OTHER REFERENCES

Novello et al., Jour. Org. Chem., vol. 25, pages 965–977 (1960).

NICHOLAS S. RIZZO, *Primary Examiner.*